United States Patent [19]
Camacho et al.

[11] Patent Number: 6,023,187
[45] Date of Patent: Feb. 8, 2000

[54] VOLTAGE PUMP FOR INTEGRATED CIRCUIT AND OPERATING METHOD THEREOF

[75] Inventors: Stephen Camacho, Durham; Robert Walker, Rougemont, both of N.C.; Tim Lao, San Jose, Calif.

[73] Assignee: Mitsubishi Semiconductor America, Inc., Durham, N.C.

[21] Appl. No.: 08/997,541

[22] Filed: Dec. 23, 1997

[51] Int. Cl.[7] ..................................................... G05F 1/10
[52] U.S. Cl. .......................... 327/536; 327/537; 327/589
[58] Field of Search ................... 327/536, 537, 327/306, 589

[56] References Cited

U.S. PATENT DOCUMENTS

| | | | |
|---|---|---|---|
| 4,638,464 | 1/1987 | Cranford, Jr. et al. | 365/226 |
| 4,736,121 | 4/1988 | Cini et al. | 307/296 R |
| 4,752,699 | 6/1988 | Cranford, Jr. et al. | 307/297 |
| 4,926,354 | 5/1990 | Pattantyus | 363/98 |
| 5,111,084 | 5/1992 | Suko | 307/571 |
| 5,138,190 | 8/1992 | Yamazaki et al. | 307/296.5 |
| 5,179,296 | 1/1993 | Ito | 327/536 |
| 5,184,030 | 2/1993 | Chung et al. | 327/537 |
| 5,193,198 | 3/1993 | Yokouchi | 395/750 |
| 5,202,588 | 4/1993 | Matsuo et al. | 327/536 |
| 5,255,224 | 10/1993 | Galbi et al. | 365/189.09 |
| 5,258,662 | 11/1993 | Skovmand | 307/296.3 |
| 5,410,465 | 4/1995 | Tan | 363/60 |
| 5,426,334 | 6/1995 | Skovmand | 327/427 |
| 5,532,915 | 7/1996 | Pantelakis et al. | 303/60 |
| 5,553,021 | 9/1996 | Kubono et al. | 305/185.33 |
| 5,553,030 | 9/1996 | Tedrow et al. | 365/226 |
| 5,553,295 | 9/1996 | Pantelakis et al. | 363/60 |
| 5,602,794 | 2/1997 | Javanifard et al. | 365/226 |
| 5,672,996 | 9/1997 | Pyeon | 327/536 |
| 5,689,208 | 11/1997 | Nadd | 327/536 |
| 5,757,228 | 5/1998 | Furutani et al. | 327/536 |
| 5,767,729 | 6/1998 | Song | 327/536 |
| 5,831,470 | 11/1998 | Park et al. | 327/536 |
| 5,835,434 | 11/1998 | Hirayama | 327/536 |

*Primary Examiner*—Timothy P. Callahan
*Assistant Examiner*—An T. Luu
*Attorney, Agent, or Firm*—McDermott, Will & Emery

[57] ABSTRACT

One embodiment of an apparatus for generating a boosted voltage to drive a data signal comprises a voltage pump that includes a driver coupled to an input signal for generating the boosted voltage signal from the input signal; a capacitor coupled to the data signal that stores a charge thereof; and an output transistor that delivers an incremental charge to the driver when the drive signal is asserted. Thus, the boosted voltage signal compensates for a change in logic level of the drive signal. In another embodiment, the apparatus also has gates for combining a plurality of data signals into a single disable-on-low signal. The disable-on-low signal is coupled to the output transistor. When all the data signals are at a low logic level, the disable-on-low signal turns off the output transistor, disabling the circuit. As a result, the circuit conserves power by generating the boosted voltage signal only when needed.

25 Claims, 5 Drawing Sheets

VOLTAGE PUMP FOR INTEGRATED CIRCUIT AND OPERATING METHOD THEREOF

FIELD OF THE INVENTION

The present invention relates to semiconductor integrated circuits, and more particularly, to a novel output voltage pump having output voltage level control and reduced power consumption by automatic disablement. The invention has particular applicability to low power integrated circuit devices.

BACKGROUND OF THE INVENTION

A recent theme or trend in the design of electronic integrated circuits is toward reduced power consumption. Power consumption is a critical issue in integrated circuits and systems designed for use in portable computers, laptop computers, personal digital assistants, and similar devices that operate on battery power. One way to reduce power consumption is to design the integrated circuits for such systems to operate at a lower voltage level. For example, integrated circuits now are being designed to operate with a typical internal supply voltage $V_{DD}$ of 3.3 volts, rather than 5 volts as in past practice.

However, certain components of particular integrated circuits cannot operate at such reduced voltage levels. Therefore, some integrated circuits have an internal voltage pump circuit that raises the supply voltage to a boosted voltage level high enough to operate particular internal components. Accurate control of the boosted voltage level is important. For example, flash memory devices require a boosted voltage level that is controlled within a narrow range to ensure accurate writing of internal memory cells.

One prior voltage pump circuit 100 is shown in FIG. 1. An input signal SIG is coupled to the input terminal 2 of an inverter 10 that inverts the logic level of SIG. The inverted output is coupled to an input terminal 3 of an inverter 12, which is one in a series coupled chain 50 of inverters 12, 14, 16, 18, and 20. The output of inverter 14 is coupled by path 22 to one side of a first capacitor 26. The other side of the first capacitor 26 is coupled to the sources of n-channel transistors 28, 30, and to the gate of transistor 30 along path 23. The drains of the transistors 28, 30 are coupled to the supply voltage $V_{DD}$;. The gate of transistor 28 is also coupled to $V_{DD}$. A storage capacitor 46 has one side coupled to a boosted voltage output signal VPPOUT and the other side coupled to $V_{DD}$.

The right side the first capacitor 26 is also coupled to the gates of two transistors 32, 34. The gate of transistor 32 is further coupled to the gate of transistor 30 by path 23. The drain of each transistor 32, 34 is coupled to $V_{DD}$. The output 24 of the last inverter 20 in the inverter chain 50 is coupled to the first side of both a second capacitor 38 and a third capacitor 40. The second side of the second capacitor 38 is coupled to the gate of an output driver transistor 42, as is the source of transistor 34. The second side of the third capacitor 40 is coupled to the drain of transistor 42. The second side of the third capacitor 40 is also coupled along path 41 to the source of transistor 32. The source terminal of transistor 42 is fed on an output path 44 as a boosted voltage output signal VPPOUT.

A transistor 36, having its gate and drain coupled to $V_{DD}$, and its source coupled to the drain of the output driver transistor 42, forms a power-on pre-charging circuit for the third capacitor 40.

Transistors 28, , and 36 are n-channel power-on precharge transistors that are used to pre-charge capacitors 26 and 46, respectively. Thus, when $V_{DD}$ is supplied, transistors 28, 36 conduct and pass $V_{DD}$, less the transistor threshold voltage drop Vth, to the right side of the first capacitor 26 and the storage capacitor 46, thereby pre-charging the first capacitor 26 and the storage capacitor 46 to a voltage level of $V_{DD}$–Vth.

Transistor 30 operates as a clamp transistor that prevents the voltage level on path 23 from rising too high. Transistor 30 is normally off, and is turned on only when path 23 is boosted above a voltage level of $V_{DD}$+Vth. When transistor 30 conducts, path 23 will fall toward the level of $V_{DD}$. Transistor 42 is a pass transistor that transfers a maximum allowable charge to capacitor 46 when the gate and the drain of transistor 42 are both boosted via path 35 and path 41.

The circuit of FIG. 1 can be implemented in a metal oxide semiconductor (MOS) integrated circuit using known fabrication techniques. The signal SIG is a digital signal having a high logic level defined as about 3.3 volts and a low logic level defined as near ground potential. The signal SIG may be, for example, a clocked output signal from another component within an integrated circuit that contains the voltage pump circuit 100, as well as other components.

Operation of the circuit 100 can be understood with reference to FIG. 5, which is a timing diagram of waveforms produced by different parts of the circuit 100, in conjunction with FIG. 1. FIG. 5 shows a first waveform 500 that represents the SIG signal; a second waveform 502 that represents the voltage level of path 22; a third waveform 504 that represents the voltage level of path 24; a fourth waveform 506 that represents the voltage level of path 23; a fifth waveform 508 that represents the voltage level of path 35 and path 41; and a sixth waveform 510 that represents the voltage level of the output signal VPPOUT.

The first, second and third waveforms have a voltage level range from ground (GND) to $V_{DD}$, as shown by the vertical axis of FIG. 5. The range of the fourth waveform is from the level ($V_{DD}$–Vth) to the level ($2V_{DD}$–Vth). The range of the fifth waveform is from the level $V_{DD}$ to the level ($2_{VDD}$).

The horizontal axis of FIG. 5 represents time. Five successive clock time intervals 512, 514, 516, 518, 520 are shown.

The voltage pump circuit 100 is operated by setting SIG to a low logic level, as shown by waveform 500 at clock interval 512. Beforehand, the circuit is turned on, which causes capacitor 26 to be pre-charged to the voltage level $V_{DD}$–Vth. Then, when SIG is pulled low, the output of inverter 20 also will be low and the output of inverter 14 will be at a high logic level. Thus path 22 becomes high or equal to $V_{DD}$, as shown by waveform 502 at clock interval 512. Between clock interval 512 and 514, the voltage level on path 23 rises. The final voltage level on path 23 is boosted to 2 $V_{DD}$–Vth, that is, the sum of $V_{DD}$ on path 22 plus the initial pre-charged voltage across the first capacitor 26 This level is shown by waveform 506 at clock interval 514. Concurrently, path 24 will be at a low logic level or ground potential, as shown by waveform 504. When node 23 rises to a level of at least $V_{DD}$+Vth, transistors 32 and 34 will turn on. When transistors 32 and 34 turn on, transistor 32 will conduct $V_{DD}$ to path 41 and transistor 34 will conduct $V_{DD}$ to path 35, as shown by waveform 508 at clock interval 514. Consequently, both the third capacitor 40 and the second capacitor 38 will be pre-charged to $V_{DD}$. Thus, the effect of pulling SIG low is to pre-charge the second and third capacitors 38, 40. The time when SIG is low is known as the pre-charge phase.

When SIG is pulled high, the output of inverter 14 is low, path 22 is low, and the output of inverter 20 is high. This relationship is shown by waveforms 500, 502 and 504 between clock intervals 514 and 516. When the output of inverter 14 goes low, the left side of the first capacitor 26 will be low or at ground potential through path 22. The right side of the first capacitor 26 will be charged to $V_{DD}$ less Vth through transistor 28, as shown by waveform 506 at clock interval 516. At the same time, path 24 is high (at voltage level $V_{DD}$), which causes paths 41 and 35 to be boosted to $2V_{DD}$, as shown by waveform 508 at clock interval 516. The $2V_{DD}$ boosted voltage level on path 35 is the sum of the initial pre-charged voltage level of $V_{DD}$ across capacitor 38 and the voltage level on path 24. Path 41 is boosted to $2\, V_{DD}$ in similar manner.

When both paths 35 and 41 are boosted, an incremental amount of charge is transferred into the storage capacitor 46, as indicated by waveform 510. Since SIG is a clock signal, during each clock cycle an additional amount of charge is added into and stored by capacitor 46. As more charge builds up in capacitor 46, the voltage level of the output VPPOUT gradually rises, as shown by waveform 510, and continues to rise until it reaches a saturation level. Accordingly, the time when SIG is high is known as the boost phase.

Normally, VPPOUT is greater than $V_{DD}$. VPPOUT typically is at least $V_{DD}$+Vth, and can vary depending on the operating conditions of the circuit 100. Since VPPOUT is usually higher than $V_{DD}$, VPPOUT is sometimes called super-$V_{DD}$.

Although this approach produces an output signal with a voltage that is boosted with respect to the input voltage, this circuit and other known voltage pump circuits have several significant disadvantages. For example, if the foregoing circuit is used to drive a large number of pins that are all being written or driven at a high logic level (that is, a condition which draws charge from capacitor 46), the boosted voltage level is greatly reduced due to the load imposed by the large number of pins. Under some conditions, the boosted voltage dips so low under multiple-pin loading that it is below the defined logic high level for the driven pins, and is therefore insufficient to drive the output pins. This can cause unexpected adverse chip performance; for example, a chip with sixteen output pins may work when two pins are driven high, but fail when all sixteen are driven high.

Other problems arise when a large number of output pins all are driven low (that is, a condition which draws little or no charge from capacitor 46) in a chip having the foregoing voltage pump circuit. In that case, the boosted voltage provided by the voltage pump circuit is unused, which wastes power. In addition, if the voltage pump continues to add charge to capacitor 46 and the load connected to the node VPPOUT does not withdraw charge from capacitor 46, then the level of VPPOUT can rise to a level which will excessively stress the silicon used to fabricate the chip.

Each of these problems becomes worse when a larger number of output pins is used in a chip, that is, when the bandwidth of the chip is increased. The problems described above will be significantly worse in a chip having 64 pins driven with a boosted voltage compared to a chip with eight pins. Thus, adverse performance by a voltage pump circuit can become a critical factor that limits improvement of low-voltage, low-power integrated circuits.

SUMMARY OF THE INVENTION

In view of the limitations associated with existing approaches for integrated circuit voltage pumps, there is a need for an arrangement that provides a voltage pump circuit that can produce a boosted output voltage that does not change in magnitude according to the number of output pins that are driven and the logic level of such pins.

There is also a need for a voltage pump circuit that can produce a boosted output voltage that compensates for the logic level each output pin that is driven.

There is also a need for an arrangement that provides a voltage pump circuit that can avoid unnecessary power use when it is driving all output pins at a low logic level.

The above and other needs are attained by the present invention, wherein an apparatus for generating a boosted voltage signal to drive a data signal comprises a voltage pump with a driver coupled to an input signal for generating the boosted voltage signal from the input signal; means coupled to the data signal for storing a charge; and means for delivering the charge to the driver when the drive signal is asserted. With this combination, the boosted voltage signal is controlled and the apparatus compensates the boosted voltage signal according to the drive signal by delivering a charge to the driver when the signal is asserted.

According to an embodiment of the present invention, the means for storing a charge is a capacitor, the driver is a transistor and the capacitor is coupled between the data signal and a drain terminal of the transistor. The means for delivering may comprise a logic gate coupled between the data signal and the capacitor. Preferably, the logic gate comprises a NAND gate and the input signal; the data signal and the input signal are coupled as inputs to the NAND gate.

According to another aspect of the invention, an apparatus for generating a boosted voltage signal further comprises a plurality of data signals, and a plurality of means for storing a charge each associated with and coupled to one of the data signals. For each of the means for storing a charge there is a means for delivering the charge to the driver when one of the data signals is asserted. In accord with the invention, a means coupled between the data signals and the voltage pump enables the voltage pump only when at least one of the data signals is asserted. In a preferred embodiment, the means for enabling comprises a first logic gate coupled between the data signals and the voltage pump. By way of example, the first logic gate may be a NOR gate having a plurality of input terminals each coupled to one of the data signals, and a second logic gate may have a first input coupled to an output terminal of the first logic gate and a second input terminal coupled to the input signal.

In another aspect of the invention, a voltage pump is provided that has means for generating a boosted output signal from an input signal; a data line; and a data line boost circuit coupled between the data line and the generating means. The data line boost circuit delivers a charge to the generating means when the data line is asserted. In accord with the invention, a means, coupled to the generating means, enables the generating means only when at least one of a plurality of data signals is asserted. A disable-on-zero circuit module may be coupled between the data line and the generating means to perform this function.

Preferably, the generating means is a first transistor coupled to a supply voltage so as to conduct a boosted voltage to a capacitor. A second transistor is coupled to the capacitor and to an input signal, and is configured to conduct the boosted voltage to an output from the capacitor when the input signal is asserted. The voltage pump may further have a plurality of data lines, and a logic gate coupled from the data lines to the generating means. In one embodiment, the logic gate is a NOR gate with a plurality of input terminals each coupled to one of the data signals. Using this arrangement, the data lines are combined and a signal to enable the voltage pump is generated by the NOR gate only when at least one of the data lines is asserted at a high logic level.

In the preferred embodiment, the data line boost circuit of the voltage pump comprises a capacitor coupled between the data line and the generating means. The input signal is $V_{DD}$, the boosted output signal is called super- $V_{DD}$, and the charge establishes a potential approximately equal to the difference between $V_{DD}$ and super-$V_{DD}$.

The data line boost circuit may be a logic gate coupled to the data line and a capacitor coupled between the logic gate and the generating means. The input signal is coupled to the logic gate to trigger conduction of the charge from the capacitor to the generating means. Thus, when the data line is asserted, the capacitor is charged and then its charge is conducted to the voltage pump to compensate for any change in voltage output of the voltage pump caused by the data line.

Preferably, the generating means is configured to pre-charge the capacitor with the charge at a potential approximately equal to the boosted output signal. This prepares the capacitor for use.

The invention also encompasses a method for generating a boosted voltage, comprising the steps of:

feeding a signal to a voltage pump having an output driver;

feeding a data line to a charge storage device; and storing a charge in the charge storage device and conducting the charge to the output driver when the data line is asserted.

In one aspect, the step of feeding a signal may be the steps of pre-charging a first capacitor with a first voltage, and feeding the signal to a second capacitor to attain a second voltage that is less than the first voltage. Also, the step of feeding a signal may comprise the steps of pre-charging a plurality of first capacitors with a first voltage, and feeding the signal to a second capacitor at a second voltage that is less than the first voltage.

Further, the step of feeding a data line may comprise the step of feeding data of the data line and the signal to a logic gate. Preferably, the step of feeding a data line is the step of charging a capacitor coupled to the logic gate when the logic gate detects that both the data line and the signal are asserted.

Another feature of the invention is the step of feeding data of a plurality of data lines to a plurality of charge storage devices, wherein each of the charge storage devices is associated with a respective one of the data lines. In one aspect, the step of feeding a data line comprises the step of feeding each of the data lines, and the signal, to one of a plurality of logic gates, wherein each of the logic gates is associated with one of the data lines. The step of feeding a data line may be the step of, for each of the data lines, charging a capacitor coupled to the logic gate associated with the data line when both the data line and the signal are asserted.

As another feature, the invention further includes the step of enabling the voltage pump only when the data line is asserted.

Another aspect of the invention is a method for driving a plurality of data lines with a boosted voltage, comprising the steps of:

feeding data from the data lines to a voltage pump having an output driver;

feeding data from each of the data lines to one of a plurality of charge storage devices;

storing a charge in the charge storage device associated with data of a respective a data line when the data line is asserted;

conducting the charge to the output driver when the respective data line is asserted; and enabling the voltage pump only when at least one of the data lines is asserted.

Preferably, the step of feeding the data lines to a voltage pump comprises the step of feeding data from a plurality of data lines to a logic gate that asserts a signal to the voltage pump only when at least one of the data lines is asserted. The step of feeding the data lines to a voltage pump may be the steps of pre-charging a first capacitor to a first voltage, and feeding a signal derived from the data lines to a second capacitor to attain a second voltage that is less than the first voltage. Advantageously, the step of feeding the data lines to a voltage pump comprises the steps of pre-charging a plurality of first capacitors to attain a first voltage, and feeding a signal derived from the data lines to a second capacitor at a second voltage that is less than the first voltage. By way of example, the step of feeding each of the data lines to one of a plurality of charge storage devices involves feeding data of each of the data lines and an enable signal to one of a plurality of logic gates, wherein each of the logic gates is associated with one of the data lines. Further, the invention may include the step of charging one of a plurality of capacitors coupled to one of the logic gates when the logic gate detects that both the data line and the enable signal are asserted, wherein each of the plurality of capacitors is associated with one of the logic gates and one of the data lines.

Additional advantages and novel features of the invention will be set forth in part in the description that follows. The advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

DETAILED DESCRIPTION OF THE PREFERRED EMBODIMENT

Figure 2:
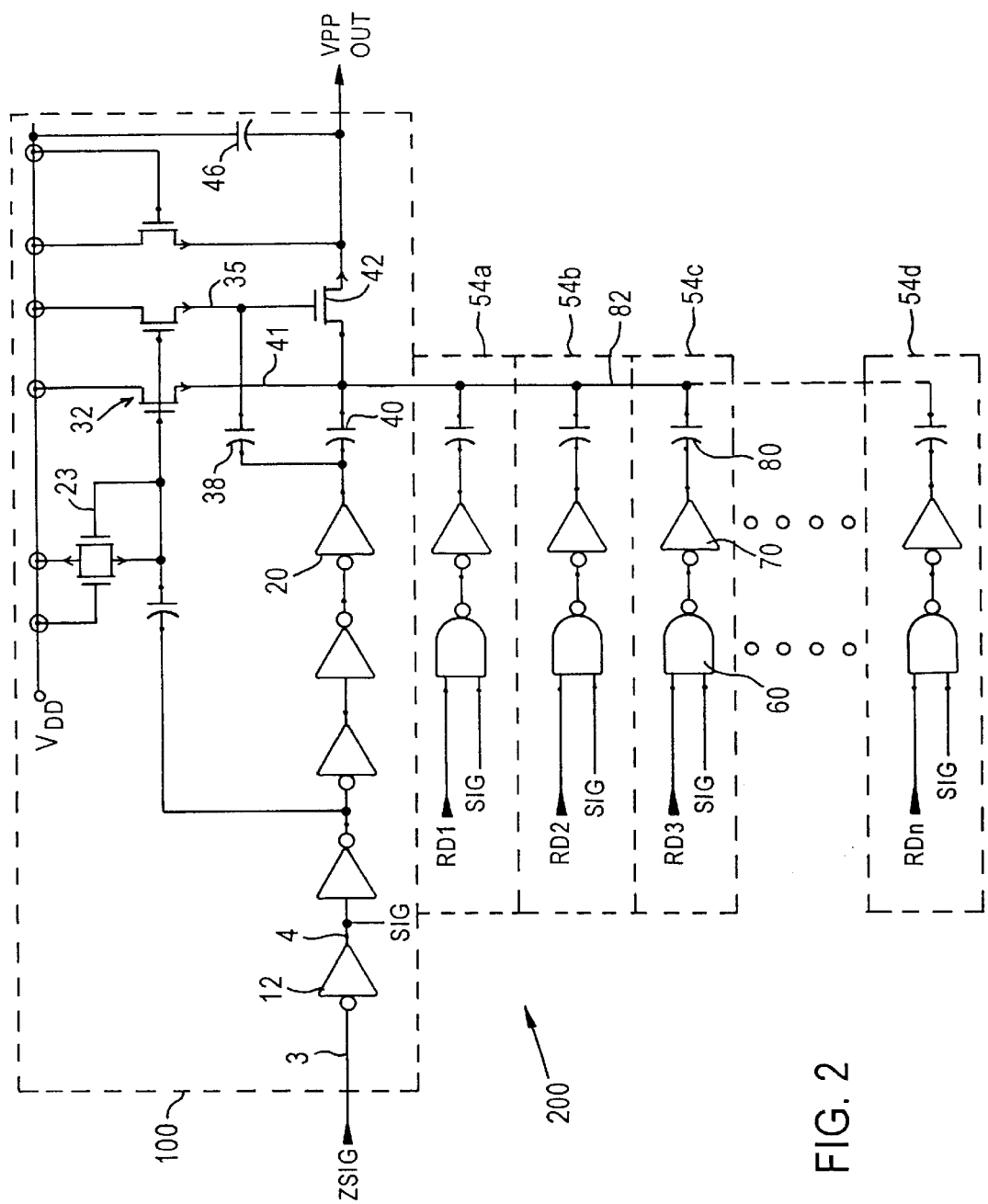
FIG. 2 is a schematic diagram of an apparatus for generating a boosted voltage according to an embodiment of the present invention.

FIG. 2 is a schematic diagram of an exemplary voltage pump circuit 200 according to a first embodiment of the present invention.

Figure 1:
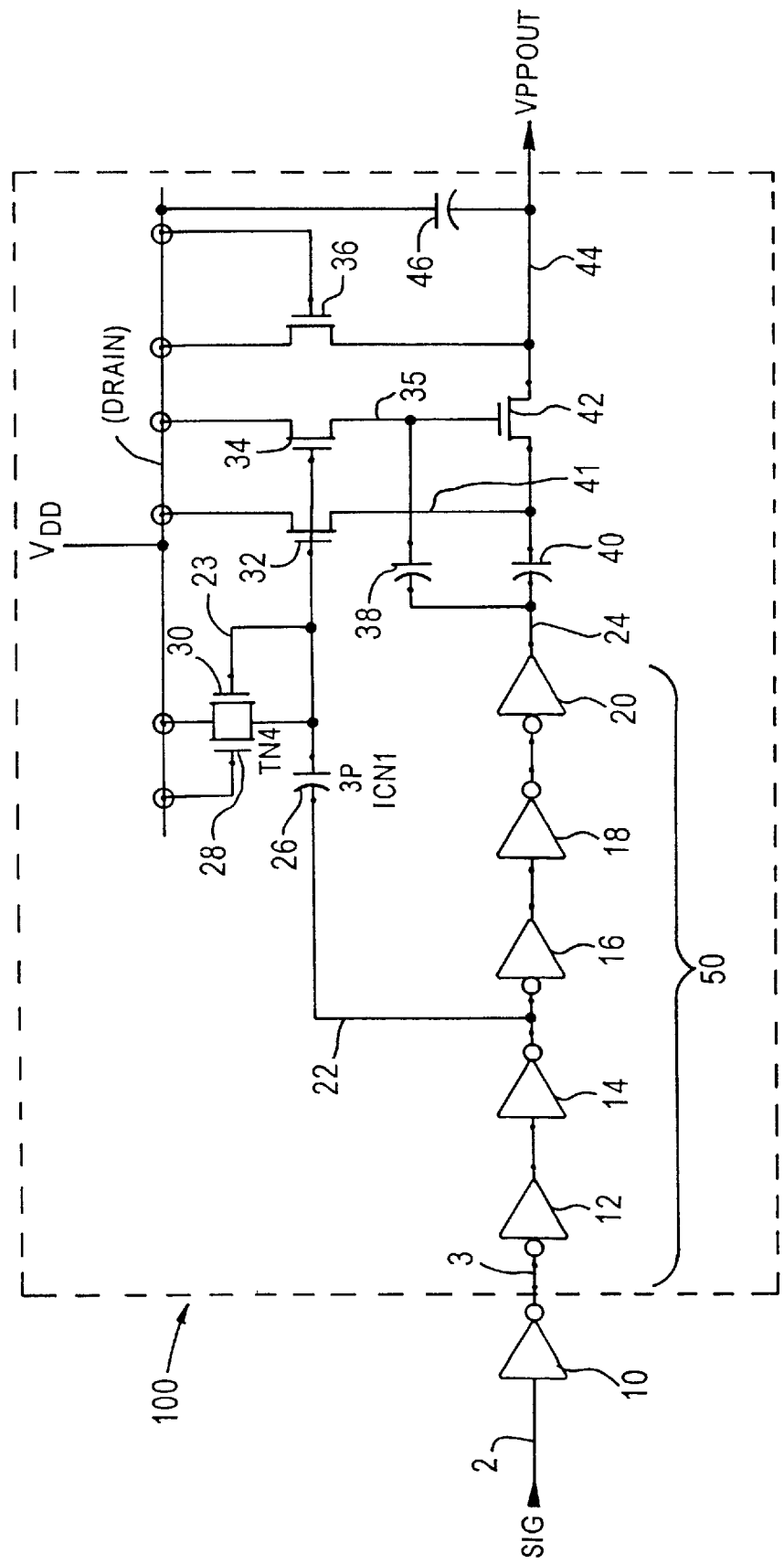
FIG. 1 is a schematic diagram of a voltage pump circuit of the prior art.

Reference numeral 100 indicates the circuit described above and shown in FIG. 1; the external inverter 10 is excluded. In one embodiment, an input signal ZSIG is applied at the input terminal 3 of the first inverter 12 in the inverter chain 50 of the circuit 100. The output terminal 4 of the inverter 12 provides a signal SIG that is the complement of ZSIG.

A plurality of data line boost circuits 54a, 54b, 54c, and 54d are each coupled to a junction between the third capacitor 40 and the output driver transistor 42 of circuit 100. A data line boost circuit is provided for each of a plurality of data lines that will be driven by the voltage pump circuit 200, such as a plurality of read data lines RD1, RD2, RD3. As indicated by the designation RDn in data line boost circuit 54d, any number of additional data lines "n" may be provided; for example, there may be eight, sixteen, or thirty-two data lines. In that case, an additional data line boost circuit is provided in the voltage pump circuit 200 for each additional data line. The discussion below will describe the components and operation of the data line boost circuit 54c as an example of the components and operation of each of the data line boost circuits 54a, 54b, 54c, 54d, or others.

The data line boost circuit 54c comprises a two-input NAND gate 60 that receives as inputs a signal from the data line RD3 to be driven and the SIG signal. The output of the NAND gate 60 drives an inverter 70. The inverter 70 is series coupled to one side of a charge storage device, such as a capacitor 80, whose other side is coupled through path 82 to the right side of the third capacitor 40 and to the output driver transistor 42. The value of the capacitor 80 is chosen to be smaller than that of the third capacitor 40 by an amount that will enable a charge storage sufficient to compensate for the loading of a pin driven by the circuit 200. Thus, in each of the data line boost circuits 54a–54d, a capacitor is associated with a data line. While a capacitor is disclosed in the preferred embodiments as the charge storage device, any other device may be used that can store and discharge a charge.

In the pre-charge phase of operation, capacitors 38 and 40 are pre-charged to $V_{DD}$ by transistors 34 and 32, respectively. Since capacitor 80 is also coupled to transistor 32 by path 41 and by path 82, it will also be pre-charged to $V_{DD}$ in the pre-charge phase. In operation, when SIG is driven high, as described above in connection with FIG. 1, the output of the inverter 20 will be high and nodes 35 and 41 will be at a boosted level causing an incremental amount of charge to be transferred from capacitor 40 to capacitor 46. If RD3 goes high while SID is driven high, then the output of the NAND gate 60 will be low and will drive the output of the inverter 70 high. The output of the inverter 70 will drive the left side of the capacitor 80 to $V_{DD}$ and an additional incremental amount of charge will be passed from capacitor 80 to capacitor 46. Thus, each data line boost circuit 54a–54d will add an incremental amount of charge to VPPOUT for every data line that is driven high.

In this way, the voltage pump circuit 200 self-compensates for any variance in VPPOUT caused by pin loading. When additional pins are driven, additional charge is supplied to VPPOUT through the capacitor 80 in each data line boost circuit 54a–54d associated with the additional pin that is driven. Therefore, the boosted voltage output is controlled.

The data line boost circuits 54a–54d shown in FIG. 2 represent one means for driving a stored charge when a driven signal is active. Many other means for performing this function are contemplated. For example, in one alternative embodiment, a data line and the SIG signal are coupled to a two-input AND gate. The output of the AND gate is coupled to a second inverter that is series coupled to the inverter 70. In addition, although the schematic symbol used in FIG. 2 for the inverter 70 shows that inversion is performed at the input of the gate, inversion performed at the output of the gate is logically equivalent and may be used.

Figure 3:
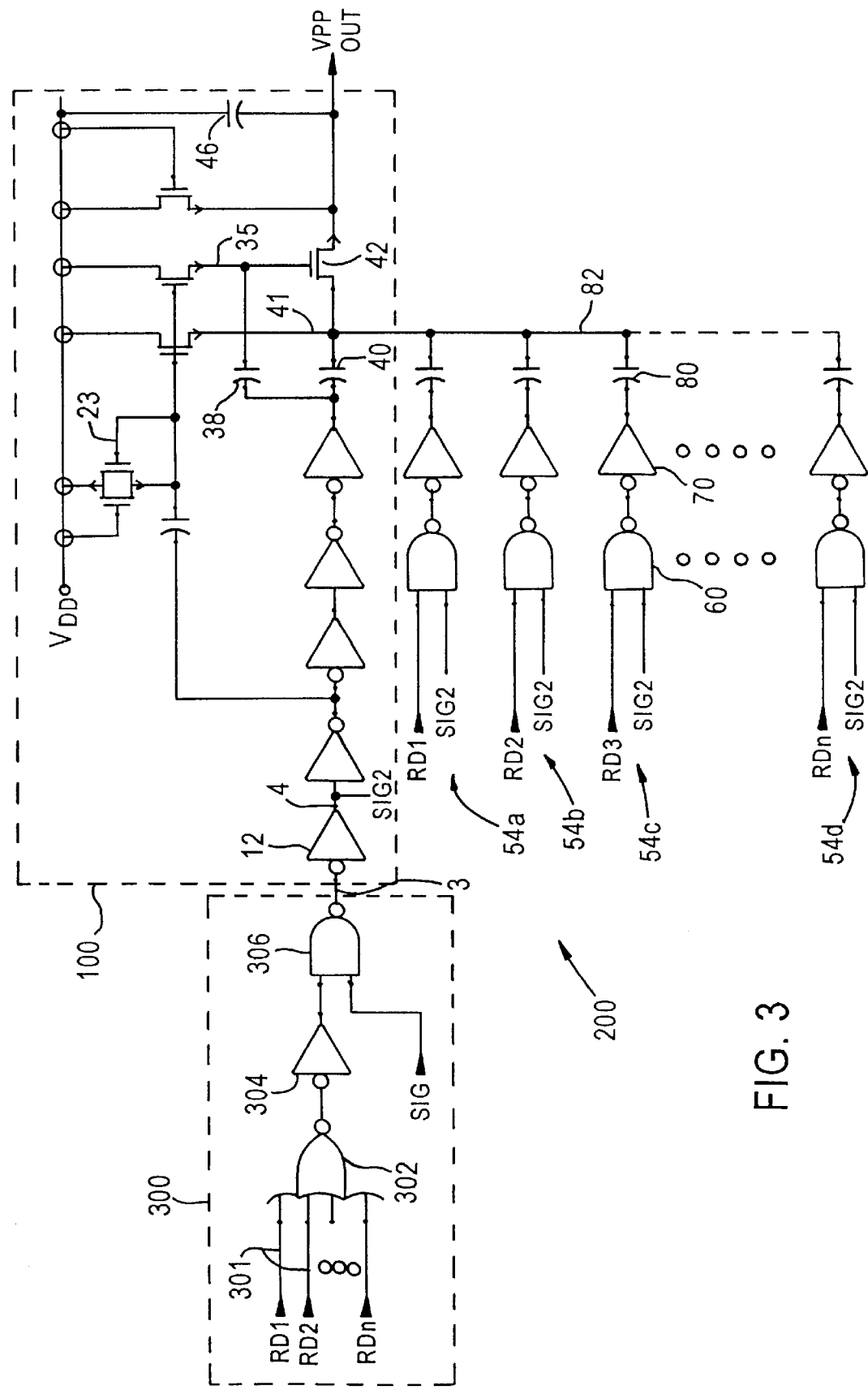
FIG. 3 is a schematic diagram of an apparatus for generating a boosted voltage according to another embodiment of the present invention.

FIG. 3 is a schematic diagram of a second embodiment of the invention that further includes a disable-on-zero circuit 300. In this embodiment, the disable-on-zero circuit 300 provides an exemplary means for enabling the voltage pump circuit only when at least one of a plurality of data lines is asserted at a high logic level. Stated in a complementary way, the circuit 300 provides a means for disabling the voltage pump circuit 200 when the circuit 200 is driving all low logic level output pins.

Each of the lines to be driven, such as read data lines RD1, RD2, through RDn, is fed or coupled to one of the input terminals 301 of a multiple-input NOR gate 302. The output of the NOR gate 302 is coupled into an inverter 304. Its output is coupled to a first input of a two-input NAND gate 306. Thus, the output of the NOR gate 302 is a signal derived from the data lines. The SIG signal is fed to the second input of the NAND gate 306.

With this arrangement, when all of the data lines RD1, RD2, through RDn are at logic low, the NOR gate 302 will assert or output a high signal. The high output of the NOR gate 302 is inverted by the inverter 304 and presented to the NAND gate 306 as logic low. When inverter 304 presents a logic low to NAND gate 306, the output of NAND gate 306 will be a logic high regardless of the logic level of SIG. When a logic high signal is presented to the input terminal 3 of inverter 12, the circuit 200 will be set to the pre-charge state. In this state, VPPOUT is not produced, and therefore the circuit 200 is effectively disabled. As described above with reference to FIG. 1, the pre-charge state occurs when SIG is asserted low, but the inverter 10 of FIG. 1 is used to invert a low SIG signal to logic high when presented to input terminal 3 of inverter 12.

Thus, according to the present invention, when all the data lines being driven are at ground or logic low, the voltage pump circuit is disabled. The voltage pump circuit is enabled only when at least one of the data lines asserts a logic high signal. This saves power by causing the voltage pump circuit not to operate when it is not needed. Also, it prevents the voltage pump circuit from damaging circuit structures on the chip by over-stressing its silicon elements through the unnecessary presence of a large voltage potential.

Figure 4:
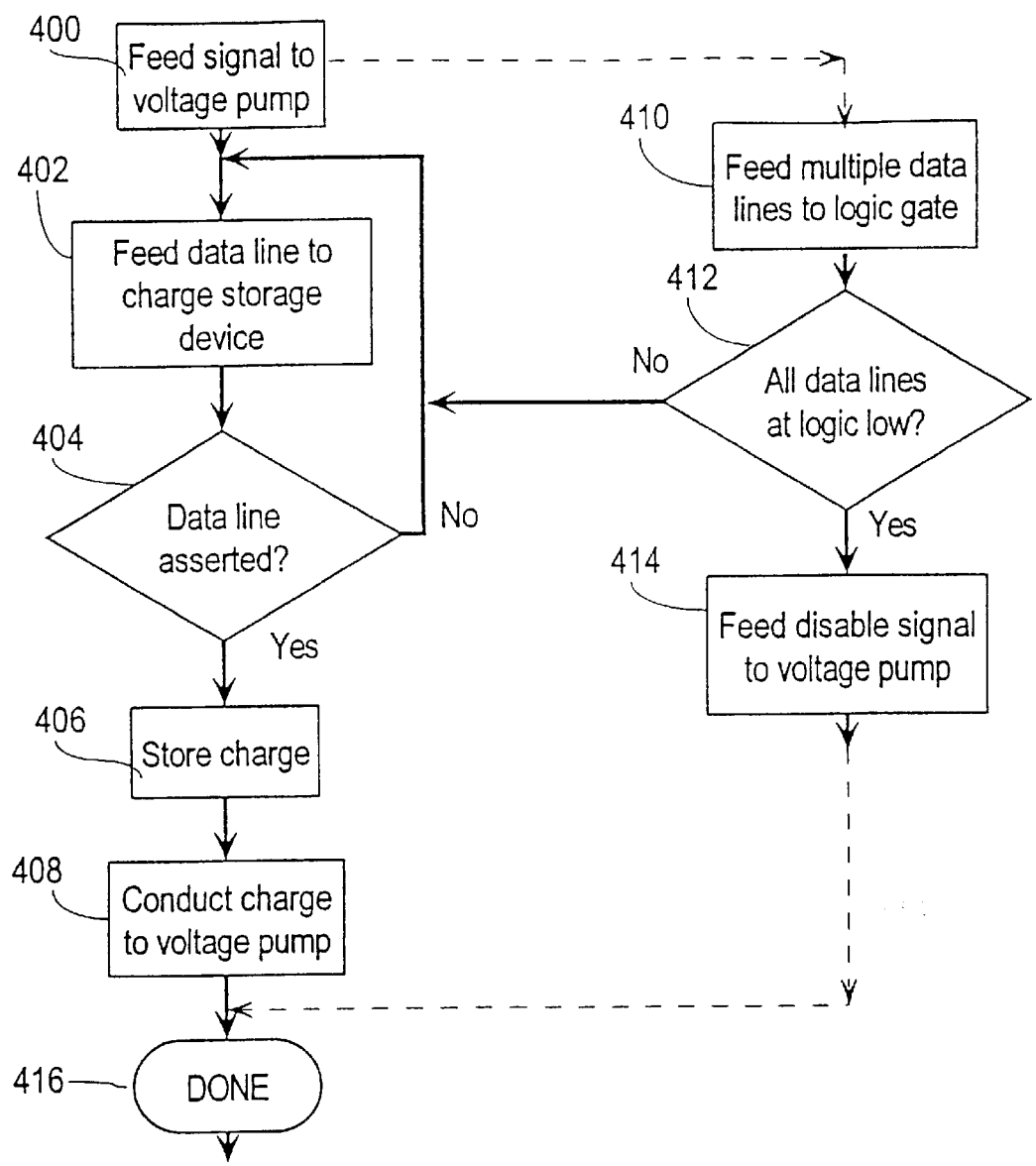
FIG. 4 is a flow diagram of a method according to the invention for generating a boosted voltage.
Figure 5:
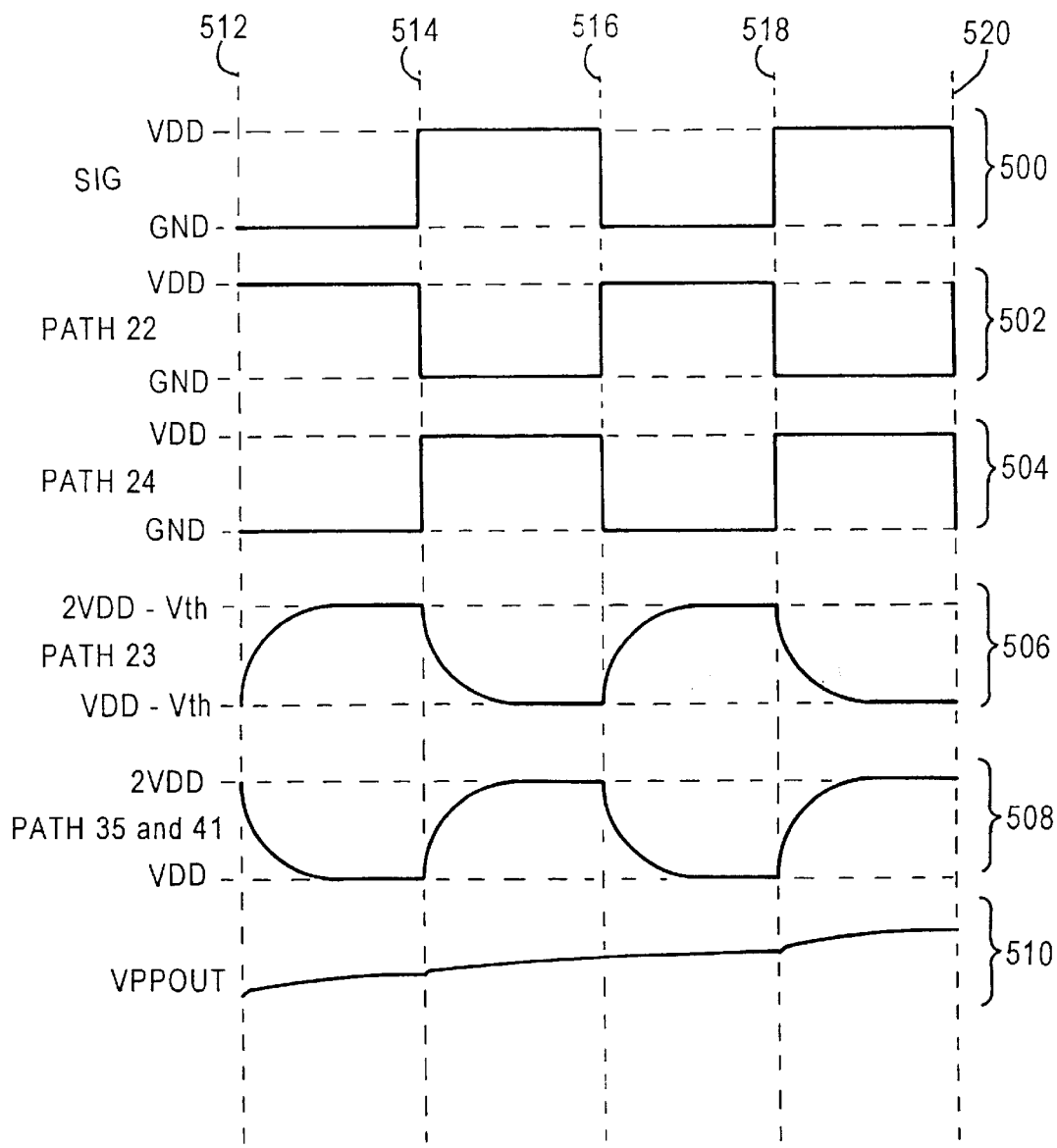
FIG. 5 is a timing diagram of waveforms produced at various points within the circuit of FIGS. 1–3.

The invention also encompasses a method of generating a boosted voltage signal as shown in FIG. 4. According to this aspect of the invention, the method is initiated by feeding a signal to a voltage pump circuit, as shown in step 400. A data line is fed to a charge storage device, as shown in step 402. If the data line is asserted, as shown in step 404, control is passed to step 406 to store a charge in association with the data line. At step 408, the charge is then conducted to the voltage pump circuit when the data line is asserted.

In another aspect, the step of feeding the signal to the voltage pump is the step of feeding multiple data lines to a logic gate, as shown in step 410. In step 412, the logic gate determines whether all the data lines are not asserted, i.e., all are at logic low. If they are, then in step 414, the logic gate feeds a disable signal to the voltage pump, thereby disabling the voltage pump when all the data lines are low. In contrast, if at least one of the logic lines is asserted high, then the test of step 412 is false and the method continues as described above at step 402.

Although the disclosed embodiments have been described with respect to data lines and read data lines that are commonly found in integrated circuit memory devices, the present invention is applicable to any integrated circuit chip that uses a boosted voltage to drive pins or on-chip components. The signals designated RD1, RD2, RDn, etc. may be any type of pin, component or signal that is driven with a boosted voltage.

In addition, the invention can be used with a wide range of supply voltage levels and boosted voltage levels.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. An apparatus for generating a boosted voltage signal to drive a data signal, comprising:
    a voltage pump comprising a driver coupled to an input signal for generating said boosted voltage signal from said input signal;
    a plurality of means for storing a charge each associated with and coupled to one of a plurality of data signals; and
    for each of said means for storing a charge, a means for delivering said charge to said driver when one of said data signals is asserted.

2. The apparatus recited in claim 1, wherein said means for storing a charge comprises a capacitor.

3. The apparatus recited in claim 2, wherein said driver is a transistor and said capacitor is coupled between said data signal and a drain terminal of said transistor.

4. The apparatus recited in claim 2, wherein said means for delivering comprises a logic gate coupled between said data signal and said capacitor.

5. The apparatus recited in claim 4, wherein said logic gate comprises a NAND gate.

6. The apparatus recited in claim 5, wherein said NAND gate is responsive to said input signal and said data signal.

7. The apparatus recited in claim 1, further comprising:
    means, coupled between the plurality of data signals and said voltage pump, for enabling said voltage pump only when at least one of said data signals is asserted.

8. The apparatus recited in claim 7, wherein said means for enabling comprises a first logic gate coupled between said data signals and said voltage pump.

9. The apparatus recited in claim 8, wherein said first logic gate is a NOR gate.

10. The apparatus recited in claim 9, wherein said NOR gate comprises a plurality of input terminals each coupled to one of said data signals.

11. The apparatus recited in claim 8, further comprising a second logic gate having a first input coupled to an output terminal of said first logic gate and a second input terminal coupled to said input signal.

12. A method for generating a boosted voltage, comprising the steps of:
    feeding a signal to a voltage pump having an output driver;
    feeding data from at least one data line to a charge storage device; and
    storing a charge in the charge storage device and conducting the charge to the output driver when a data line is asserted,
    wherein the step of feeding a signal comprises the steps of:
        pre-charging at least one first capacitor to a first voltage; and
        feeding the signal to a second capacitor to attain a second voltage that is less than the first voltage.

13. The method recited in claim 12, wherein
    a plurality of first capacitors is pre-charged to the first voltage.

14. The method recited in claim 12, wherein the step of feeding a data line comprises the step of:
    feeding data of the data line and the signal to a logic gate.

15. The method recited in claim 14, wherein the step of feeding a data line further comprises the step of:
    charging a capacitor when the logic gate detects both the data line and the signal are asserted.

16. The method recited in claim 12, further comprising the step of:
    feeding data of a plurality of data lines to a plurality of charge storage devices, wherein each of the charge storage devices is associated with a respective one of the data lines.

17. The method recited in claim 16, wherein the step of feeding data of a data line comprises the step of:
    feeding data of each of the data lines, and the signal, to one of a plurality of a logic gates, wherein each of the logic gates is associated respectively with one of the data lines.

18. The method recited in claim 17, wherein the step of feeding a data line further comprises the step of:
    for each of the data lines, charging a capacitor coupled to the logic gate associated with the data line when both the data line and the signal are asserted.

19. The method recited in claim 12, further comprising the step of:
    enabling the voltage pump only when the data line is asserted.

20. A method for driving a plurality of data lines with a boosted voltage, comprising the steps of:
    feeding data from the data lines to a voltage pump having an output driver;
    feeding data from each of the data lines to one of a plurality of charge storage devices;
    storing a charge in the charge storage device associated with data of a respective data line when the data line is asserted;
    conducting the charge to the output driver when the respective data line is asserted; and
    activating the voltage pump only when at least one of the data lines is asserted.

21. The method recited in claim 20, wherein the step of feeding data from the data lines to a voltage pump comprises the step of:
    feeding data from a plurality of data lines to a logic gate that asserts a signal to the voltage pump only when at least one of the data lines is asserted.

22. The method recited in claim 20, wherein the step of feeding data from the data lines to a voltage pump comprises the steps of:
    pre-charging a first capacitor to a first voltage; and
    feeding a signal derived from the data lines to a second capacitor to attain a second voltage that is less than the first voltage.

23. The method recited in claim 22, wherein the step of feeding the data lines to a voltage pump comprises the steps of:

pre-charging a plurality of first capacitors to a first voltage; and feeding a signal derived from the data lines to a second capacitor to attain a second voltage that is less than the first voltage.

24. The method recited in claim 20, wherein the step of feeding data from each of the data lines to one of a plurality of charge storage devices comprises the step of:

feeding data of each of the data lines and an enable signal to one of a plurality of logic gates, wherein each of the logic gates is associated with one of the data lines.

25. The method recited in claim 24, wherein the step of feeding data of each of the data lines to one of a plurality of charge storage devices further comprises the step of:

charging one of a plurality of capacitors coupled to one of the logic gates when the logic gate detects that both the data line and the enable signal are asserted, wherein each of the plurality of capacitors is associated with one of the logic gates and one of the data lines.

* * * * *